United States Patent
Xu et al.

(10) Patent No.: US 11,257,019 B2
(45) Date of Patent: Feb. 22, 2022

(54) METHOD AND SYSTEM FOR SEARCH PROVIDER SELECTION BASED ON PERFORMANCE SCORES WITH RESPECT TO EACH SEARCH QUERY

(71) Applicant: Yahoo Holdings, Inc., Sunnyvale, CA (US)

(72) Inventors: Jin Xu, Fremont, CA (US); Priscilla Amirtharaj, Cupertino, IL (US)

(73) Assignee: VERIZON MEDIA INC., New York, NY (US)

( * ) Notice: Subject to any disclaimer, the term of this patent is extended or adjusted under 35 U.S.C. 154(b) by 282 days.

(21) Appl. No.: 15/444,569

(22) Filed: Feb. 28, 2017

(65) Prior Publication Data
US 2018/0247247 A1     Aug. 30, 2018

(51) Int. Cl.
*G06Q 10/06* (2012.01)
*G06Q 30/02* (2012.01)
*G06F 16/951* (2019.01)
*G06F 16/953* (2019.01)

(52) U.S. Cl.
CPC ..... *G06Q 10/06393* (2013.01); *G06F 16/951* (2019.01); *G06F 16/953* (2019.01); *G06Q 30/0256* (2013.01)

(58) Field of Classification Search
None
See application file for complete search history.

(56) References Cited

U.S. PATENT DOCUMENTS

| | | | | |
|---|---|---|---|---|
| 9,342,559 | B1 * | 5/2016 | Jedrzejowicz | G06Q 30/016 |
| 10,037,310 | B1 * | 7/2018 | Marra | G06F 16/94 |
| 2006/0085399 | A1 * | 4/2006 | Carmel | G06F 16/951 |
| 2008/0154666 | A1 * | 6/2008 | Kuo | G06Q 10/0635 |
| | | | | 705/14.53 |
| 2009/0055388 | A1 * | 2/2009 | Song | G06F 16/951 |
| 2009/0193014 | A1 * | 7/2009 | Menezes | G06F 16/90335 |
| 2010/0281012 | A1 * | 11/2010 | Imig | G06F 16/951 |
| | | | | 707/708 |
| 2011/0225192 | A1 * | 9/2011 | Imig | G06F 16/9535 |
| | | | | 707/775 |
| 2012/0130814 | A1 * | 5/2012 | Hayes | G06Q 30/0256 |
| | | | | 705/14.54 |
| 2012/0150854 | A1 * | 6/2012 | Song | G06F 16/9558 |
| | | | | 707/728 |

(Continued)

OTHER PUBLICATIONS

P. Sirotkin, On Search Engine Evaluation Metrics, Feb. 10, 2013, Cornell University, Doctoral Thesis (Year: 2013).*

*Primary Examiner* — Patricia H Munson
*Assistant Examiner* — Chesiree A Walton
(74) *Attorney, Agent, or Firm* — Venable LLP

(57) ABSTRACT

The present teaching relates to managing computing resources. In one example, a search query is received from a user. A plurality of performance scores associated with a plurality of providers is obtained from a provider score database. One of the plurality of providers is selected based on the plurality of performance scores. The search query is transmitted to be performed by the selected one of the plurality of providers. One or more search results are received in response to the search query from the selected one of the plurality of providers. The one or more search results are presented to the user to be displayed on a user device.

22 Claims, 13 Drawing Sheets

(56) References Cited

U.S. PATENT DOCUMENTS

| | | | |
|---|---|---|---|
| 2012/0158488 A1* | 6/2012 | Bottou | G06Q 30/0243 705/14.42 |
| 2015/0006280 A1* | 1/2015 | Ruiz | G06Q 30/0246 705/14.45 |
| 2015/0142557 A1* | 5/2015 | Krishnamurthy | G06Q 30/0241 705/14.45 |
| 2015/0363407 A1* | 12/2015 | Huynh | G06F 16/35 707/738 |
| 2017/0140053 A1* | 5/2017 | Vorobev | G06N 20/00 |

* cited by examiner

METHOD AND SYSTEM FOR SEARCH PROVIDER SELECTION BASED ON PERFORMANCE SCORES WITH RESPECT TO EACH SEARCH QUERY

BACKGROUND

1. Technical Field

The present teaching relates to methods, systems, and programming for Internet services. Particularly, the present teaching is directed to methods, systems, and programming for selecting a search provider for providing search results in response to a query based on performance scores of one or more search providers with respect to the query.

2. Discussion of Technical Background

Online content search is a process of interactively searching for and retrieving requested information via a search application running on a local user device, such as a computer or a mobile device, from online databases. Online search may be conducted through search engines, which are programs running at a remote server, e.g. a search provider, and searching documents for specified keywords and return a list of the documents where the keywords were found. Given search providers like Google, Bing and Yahoo!, a search application may select one of them for performing searching with respect to a search query received from a user.

Most of the current techniques about search provider selection are based on users' explicit selection, e.g. what search provider a user selects as his/her default or specific choice. Some of existing techniques about search provider selection focus on search providers' performance based on users' explicit feedbacks. While these methods may be used to select a search provider for a user, they cannot be used to select a search provider for each search query.

Therefore, there is a need to develop techniques for search provider selection to overcome the above drawbacks.

SUMMARY

The present teaching relates to methods, systems, and programming for Internet services. Particularly, the present teaching is directed to methods, systems, and programming for selecting a search provider for providing search results in response to a query based on performance scores of one or more search providers with respect to the query.

In one example, a method, implemented on a machine having at least one processor, storage, and a communication platform capable of connecting to a network for directing a search query, is disclosed. A search query is received from a user. A plurality of performance scores associated with a plurality of providers is obtained from a provider score database. One of the providers is selected based on the plurality of performance scores. The search query is transmitted to be performed by the selected one of the plurality of providers. One or more search results are received in response to the search query from the selected one of the plurality of providers. The one or more search results are presented to the user to be displayed on a user device.

In another example, a method, implemented on a machine having at least one processor, storage, and a communication platform capable of connecting to a network for evaluating performance of a search provider, is disclosed. Search behavior information is retrieved in response to a search query from a user. A plurality of search behaviors associated with a search result page rendered by a search provider with respect to the search query is identified. The search result page includes at least one content item and at least one advertisement. A performance score of the search provider is estimated with respect to the search query based on one or more first search behaviors directed to the at least one content item and one or more second search behaviors directed to the at least one advertisement. The performance score of the search provider is stored with respect to the search query in a provider score database.

In yet another example, a system having at least one processor, storage, and a communication platform connected to a network for directing a search query is disclosed. The system comprises: a user interface configured for receiving a search query from a user; a query dispatcher configured for: obtaining a plurality of performance scores associated with a plurality of providers from a provider score database, selecting one of the plurality of providers based on the plurality of performance scores, and transmitting the search query to be performed by the selected one of the plurality of providers; and a browser configured for receiving one or more search results in response to the search query from the selected one of the plurality of providers, wherein the user interface is further configured for presenting the one or more search results to the user to be displayed on a user device.

Other concepts relate to software for implementing the present teaching on search provider selection with respect to each query. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having data recorded thereon for directing a search query is disclosed. The medium, when read by the machine, causes the machine to perform the following: receiving a search query from a user; obtaining a plurality of performance scores associated with a plurality of providers from a provider score database; selecting one of the plurality of providers based on the plurality of performance scores; transmitting the search query to be performed by the selected one of the plurality of providers; receiving one or more search results in response to the search query from the selected one of the plurality of providers; and presenting the one or more search results to the user to be displayed on a user device.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
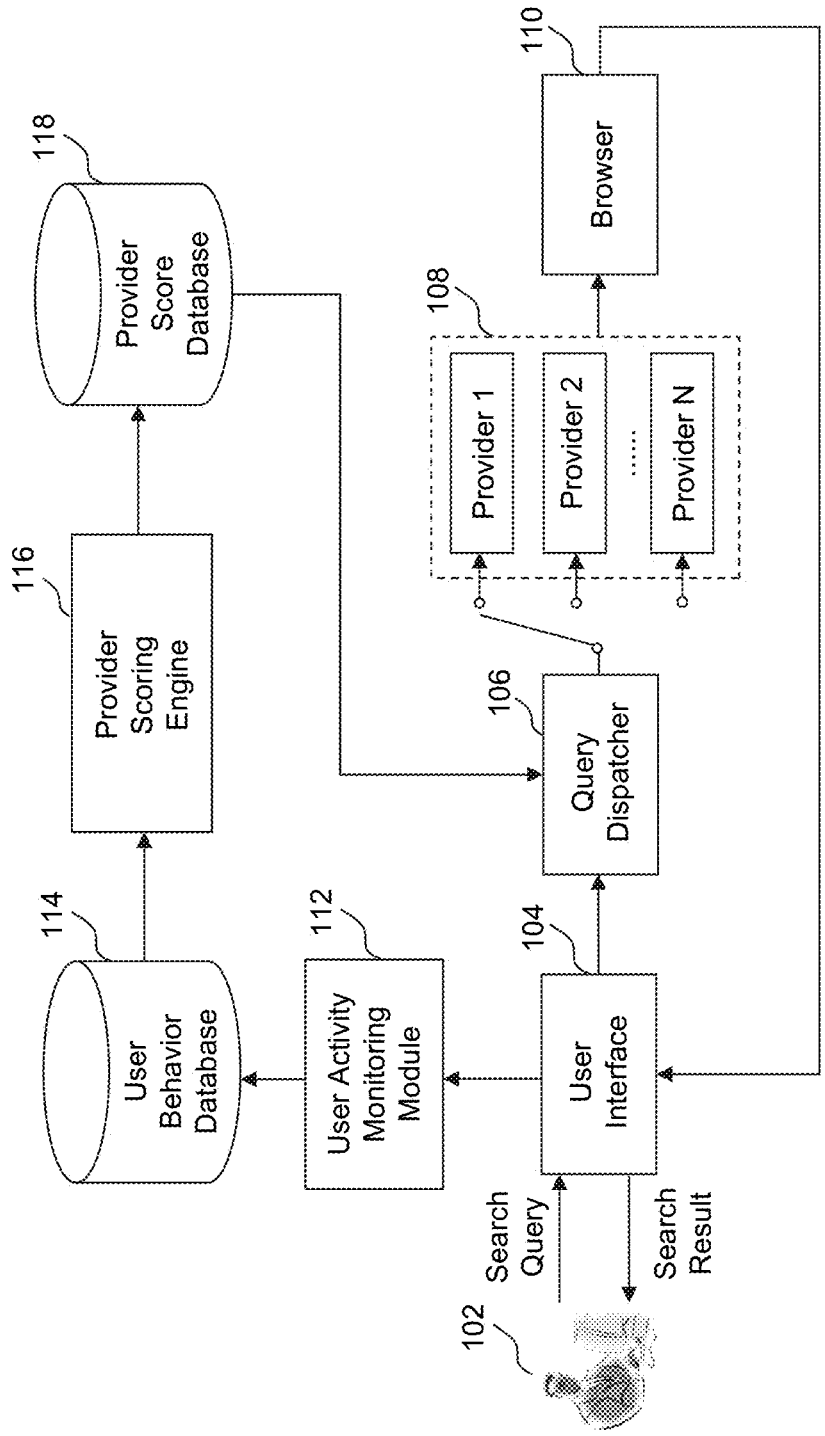
FIG. 1 illustrates an exemplary diagram of a system for search provider selection with respect to each query, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of search provider selection with respect to each query. The method and system as disclosed herein aim at improving user experience and ad performance related to online search with respect to each search query.

The present teaching discloses a system for selecting search providers or ad providers by evaluating performances of different providers based on user experience and ad related behaviors. The system may direct search traffic to the selected ad provider. In particular, the performance evaluation may be based on each search query coming through the search traffic. The system can direct each search query to a selected search provider that can perform a better search based on the search query, in accordance with the evaluated performance.

In one embodiment, the system can comprehensively evaluate the search experience including user experience and ad-related behaviors. By comparing the user experience on different ads providers using a comprehensive metrics success score, the system can continuously learn and update the scoring model over time. Search traffic can be dispatched to the right provider based on the aggregated success score of each search query.

In one example, the system can measure user search behavior quantitatively for each search session. For example, with a tree-shape scoring model, the system can simulate and summarize different search sessions. In one example, the scores of the simulated sessions, e.g. 22M search sessions, are discrete, while 95% of the sessions fall into a symmetric distribution within a reasonable range. The scores can be aggregated by each normal query (no head, no tail) and each ad provider (e.g. Google, Bing and Yahoo!). These per-query scores are compared between ad providers for user experience and ads related behaviors combined performance evaluation at the query level.

In one embodiment, the system can implement an expectation-maximization algorithm to optimize the parameters in the scoring model. The scoring model can be adjusted according to user behaviors on ads and/or user experience metrics.

By measuring both user experience and ad-related user behavior in one simple score, e.g. a success score, and simulating the user behavior systematically to quantify the performance of each query on different ad providers, the system can continuously learn and update the scoring model over time to optimize ad provider selection for each query.

The terms "provider", "search provider" and "ad provider" may be used interchangeably herein. The terms "query" and "search query" may be used interchangeably herein.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 illustrates an exemplary diagram of a system 100 for search provider selection with respect to each query, according to an embodiment of the present teaching. In FIG. 1, the system 100 includes a user 102, a user interface 104, a query dispatcher 106, one or more providers 108, a browser 110, a user activity monitoring module 112, a user behavior database 114, a provider scoring engine 116, and a provider score database 118.

The user 102 in this example may be a user that submits a search query via the user interface 104. The user interface 104 may be a user interface of a search application on a user device, e.g. a computer, a smartphone, a virtual reality device, etc. The user interface 104 in this example may receive the search query from the user 102 and forward it to the query dispatcher 106 for dispatching the query. In addition, the user interface 104 in this example may obtain one or more search results from the browser 110 and present them to the user 102. Then the user interface 104 may instruct the user activity monitoring module 112 to monitor user activities of the user 102.

The query dispatcher 106 in this example may obtain, from the provider score database 118, a plurality of performance scores associated with the plurality of providers 108 respectively. Each performance score for a corresponding provider indicates a predicted level of user satisfaction when the search query is used to perform search on the corresponding provider. The query dispatcher 106 may select one of the providers 108 based on their respective performance scores. The query dispatcher 106 can then transmit the search query to the selected one of the plurality of providers 108.

Each of the providers 108 may be a search provider, e.g. Google, Bing and Yahoo!, which can provide advertisements with the search results in response to the search query. As different search providers may be associated with different advertisers and have different advertisement policy or contracts with respect to a query, when the query dispatcher 106 selects one of the providers 108, it selects the provider to perform search for the query and provide one or more advertisements to the user along with the search results. After the selected provider receives the search query, it may perform search online based on the search query and provide the search results and corresponding advertisements to the browser 110.

The browser 110 in this example may receive one or more search results in response to the search query from the selected one of the plurality of providers and present the one or more search results to the user to be displayed via the user interface 104 on a user device. As discussed above, the search results may be presented together with one or more advertisements that the user may click on.

The user activity monitoring module 112 in this example may monitor and collect user interaction information with the presented one or more search results, and store the user interaction information into the user behavior database 114. The user interaction information may include information about: user's quick retry of the search, a reformulation of the query, an abandonment of the search results, a first number of clicks on one or more direct display content items in the one or more search results, a second number of clicks on one or more web content items in the one or more search results, a third number of clicks on a short dwell time session that the user spent on a plurality of advertisements in the one or more search results, a fourth number of clicks on a median dwell time session that the user spent on the plurality of advertisements in the one or more search results, and a fifth number of clicks on a long dwell time session that the user spent on the plurality of advertisements in the one or more search results.

The provider scoring engine 116 in this example may evaluate or re-evaluate a performance score associated with a previously selected one of the plurality of providers using the collected user interaction information. Based on the re-evaluated plurality of performance scores, the provider scoring engine 116 may update the provider score database 118. A performance score is associated with a single provider and a single query. In one embodiment, the provider scoring engine 116 may run simulations of different possible queries on different providers, and evaluate the corresponding performance scores, and store the performance scores in the provider score database 118 with information of corresponding providers and queries.

Figure 2A:
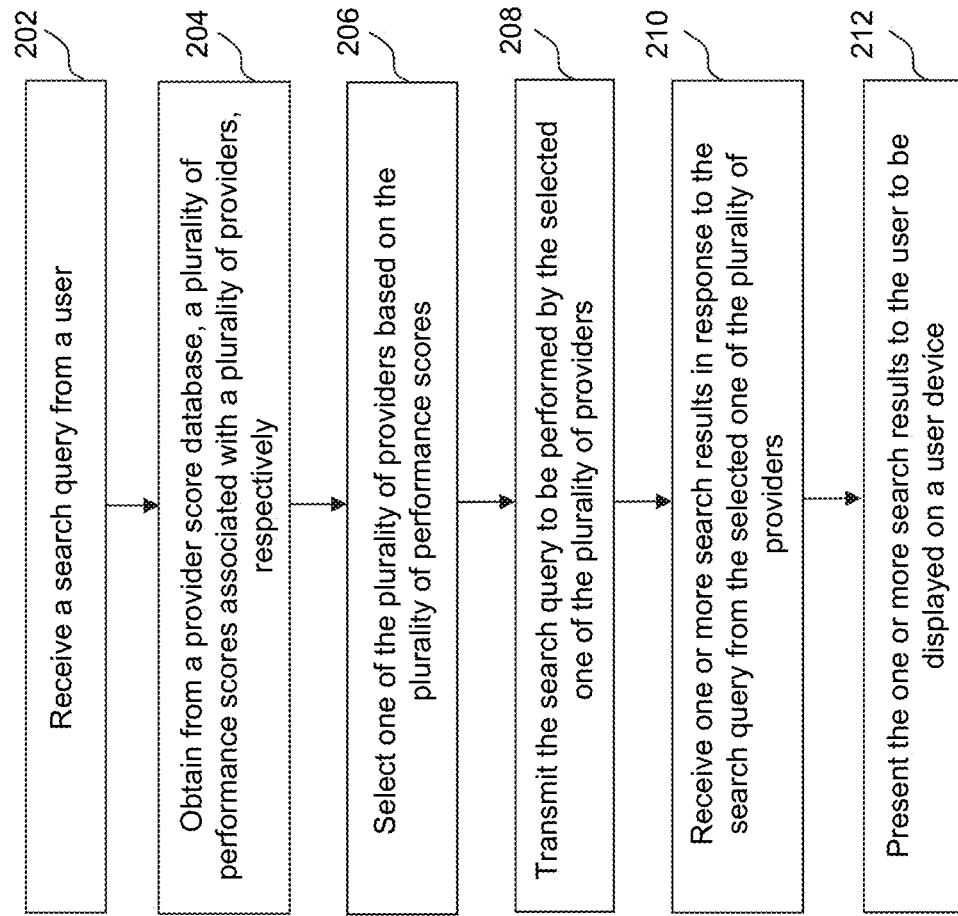
FIG. 2A illustrates an exemplary process of search provider selection with respect to each query, according to an embodiment of the present teaching.

FIG. 2A illustrates an exemplary process 200-A of search provider selection with respect to each query, according to an embodiment of the present teaching. At 202, a search query is received from a user. A plurality of performance scores associated with a plurality of providers respectively is obtained at 204 from a provider score database. One of the providers is selected at 206 based on the plurality of performance scores. The search query is transmitted at 208 to be performed by the selected one of the plurality of providers. One or more search results are received at 210 in response to the search query from the selected one of the plurality of providers. The one or more search results are presented at 212 to the user to be displayed on a user device.

Figure 2B:
FIG. 2B illustrates another exemplary process of search provider selection with respect to each query, according to an embodiment of the present teaching.

FIG. 2B illustrates another exemplary process 200-B of search provider selection with respect to each query, according to an embodiment of the present teaching. At 201, a search query is received from a user. A plurality of performance scores associated with a plurality of providers respectively are obtained at 203 from a provider score database. One of the providers is selected at 205 based on the plurality of performance scores. The search query is transmitted at 207 to be performed by the selected one of the plurality of providers. One or more search results are received at 209 in response to the search query from the selected one of the plurality of providers. The one or more search results are presented at 211 to the user to be displayed on a user device. User interaction information is collected at 213 with the presented one or more search results. The performance score associated with the selected one of the plurality of providers is re-evaluated at 215 using the collected user interaction information. The provider score database is updated at 217 using the re-evaluated plurality of performance scores.

Figure 3:
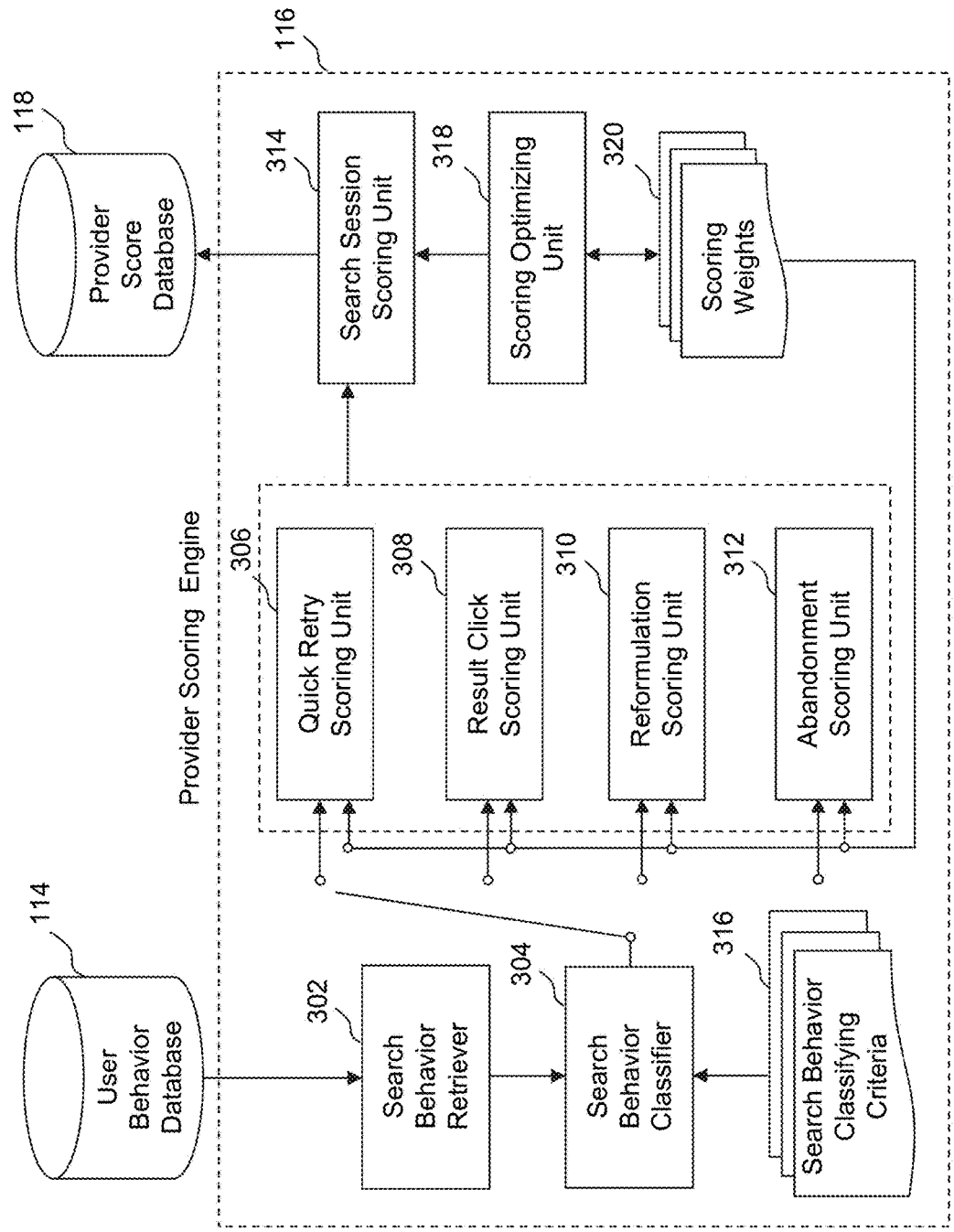
FIG. 3 illustrates an exemplary diagram of a provider scoring engine, according to an embodiment of the present teaching.

FIG. 3 illustrates an exemplary diagram of a provider scoring engine 116, according to an embodiment of the present teaching. As shown in FIG. 3, the provider scoring engine 116 in this example includes a search behavior retriever 302, a search behavior classifier 304, one or more stored search behavior classifying criteria 316, a quick retry scoring unit 306, a result click scoring unit 308, a reformulation scoring unit 310, an abandonment scoring unit 312, a search session scoring unit 314, a scoring optimizing unit 318, and one or more stored scoring weights 320. The search behavior retriever 302 in this example may retrieve information of user behaviors about a search performed by a provider in response to a query from a user, e.g. from the user behavior database 114. The search behavior retriever 302 may send the retrieved information to the search behavior classifier 304 for search behavior classification.

The search behavior classifier 304 in this example may receive the retrieved user behavior information from the search behavior retriever 302. The search behavior classifier 304 may select one or more of the stored search behavior classifying criteria 316 and classify the search behavior into a plurality of behavioral sessions, according to the selected criteria. For example, the search behavior classifier 304 may classify a search session into a "quick retry" session when the search behavior in the session indicates that the user submits another query that is irrelevant to previous query, within a short time period after receiving the search results. The search behavior classifier 304 may classify a search session into a "result click" session when the search behavior in the session indicates that the user clicks on one or more of the presented search results. The search behavior classifier 304 may classify a search session into a "reformulation" session when the search behavior in the session indicates that the user reformulates the previous query, e.g. by replacing one or more letters, or one or more words in the previous query to generate a new query, and submits the new query for a new search. The search behavior classifier 304 may classify a search session into an "abandonment" session when the search behavior in the session indicates that the user abandon the presented search results, e.g. by closing the browser without clicking on any of the presented search results or by dwelling for more than a time period, e.g. five minutes, after receiving the search results. Based on the classification of user behaviors at the search behavior classifier 304, the search behavior classifier 304 may send each search behavior to one of the scoring units 306, 308, 310, 312, according to the classification result for the search behavior.

The quick retry scoring unit 306 in this example may receive, from the search behavior classifier 304, user behaviors classified into the "quick retry" behavioral session. The quick retry scoring unit 306 may compute a behavior score with respect to each quick retry behavior associated with the query and the provider. For example, the quick retry scoring unit 306 may compute a negative behavior score (−a) for each query-provider pair that has a "quick retry" session, which may indicate a decrease of user satisfaction with respect to this query-provider pair because the user quickly retry another query after receiving the search results. The quick retry scoring unit 306 may send the computed scores to the search session scoring unit 314 for estimating a search session score.

The result click scoring unit 308 in this example may receive, from the search behavior classifier 304, user behaviors classified into the "result click" behavioral session. The result click scoring unit 308 may compute a behavior score with respect to each result click behavior associated with the query-provider pair. For example, the result click scoring unit 308 may compute a positive behavior score for each query-provider pair that has a "result click" session, which may indicate an increase of user satisfaction with respect to this query-provider pair because the user clicks on some search results. In other example, the "result click" may include clicks on search results and clicks on commercial links, e.g. advertisements or any link that may bring revenue to the provider. In one embodiment, the result click scoring unit 308 may compute scores for a "result click" session based on dwell time of the user after the click, and/or based on the type of content clicked by the user, e.g. a direct display or a web link. The result click scoring unit 308 may send the computed scores to the search session scoring unit 314 for estimating a search session score.

The reformulation scoring unit 310 in this example may receive, from the search behavior classifier 304, user behaviors classified into the "reformulation" behavioral session. The reformulation scoring unit 310 may compute a behavior score with respect to each reformulation behavior associated with the query-provider pair. For example, the reformulation scoring unit 310 may compute a negative behavior score (−b) for each query-provider pair that has a "reformulation" session, which may indicate a decrease of user satisfaction with respect to this query-provider pair because the user reformulates the previous query after receiving the search results. The reformulation scoring unit 310 may send the computed scores to the search session scoring unit 314 for estimating a search session score.

The abandonment scoring unit 312 in this example may receive, from the search behavior classifier 304, user behaviors classified into the "abandonment" behavioral session. The reformulation scoring unit 310 may compute a behavior score with respect to each abandonment behavior associated with the query-provider pair. For example, the abandonment scoring unit 312 may compute a negative behavior score (−c) for each query-provider pair that has a "abandonment" session, which may indicate a decrease of user satisfaction with respect to this query-provider pair because the user abandons the presented search results without any clicks.

The abandonment scoring unit 312 may send the computed scores to the search session scoring unit 314 for estimating a search session score.

The search session scoring unit 314 in this example may receive the behavior scores from the quick retry scoring unit 306, the result click scoring unit 308, the reformulation scoring unit 310, and/or the abandonment scoring unit 312. The search session scoring unit 314 may obtain a plurality of scoring weights from the scoring optimizing unit 318 and estimate a search session score using the plurality of scoring weights and the computed behavior scores. The search session scoring unit 314 may store the search session score with respect to the provider and the query in the provider score database 118.

The scoring optimizing unit 318 in this example may optimize or update the stored scoring weights 320 based on an expectation-maximization algorithm, and send the optimized scoring weights to the search session scoring unit 314 for aggregating the behavior scores and estimating the search session score.

Figure 4:
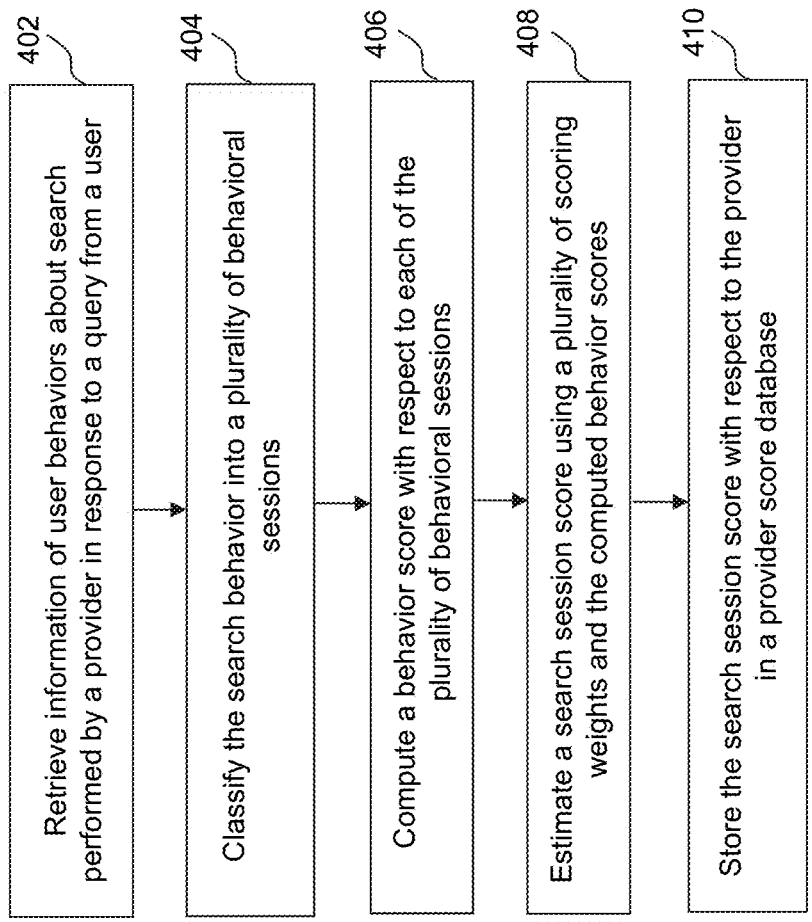
FIG. 4 is a flowchart of an exemplary process performed by a provider scoring engine, according to an embodiment of the present teaching.

FIG. 4 is a flowchart of an exemplary process performed by a provider scoring engine, e.g. the provider scoring engine 116 in FIG. 3, according to an embodiment of the present teaching. Information of user behaviors is retrieved at 402 about search performed by a provider in response to a query from a user. The search behavior is classified at 404 into a plurality of behavioral sessions. A behavior score is computed at 406 with respect to each of the plurality of behavioral sessions. A search session score is estimated at 408 using a plurality of scoring weights and the computed behavior scores. The search session score is stored at 410 with respect to the provider in a provider score database.

Figure 5:
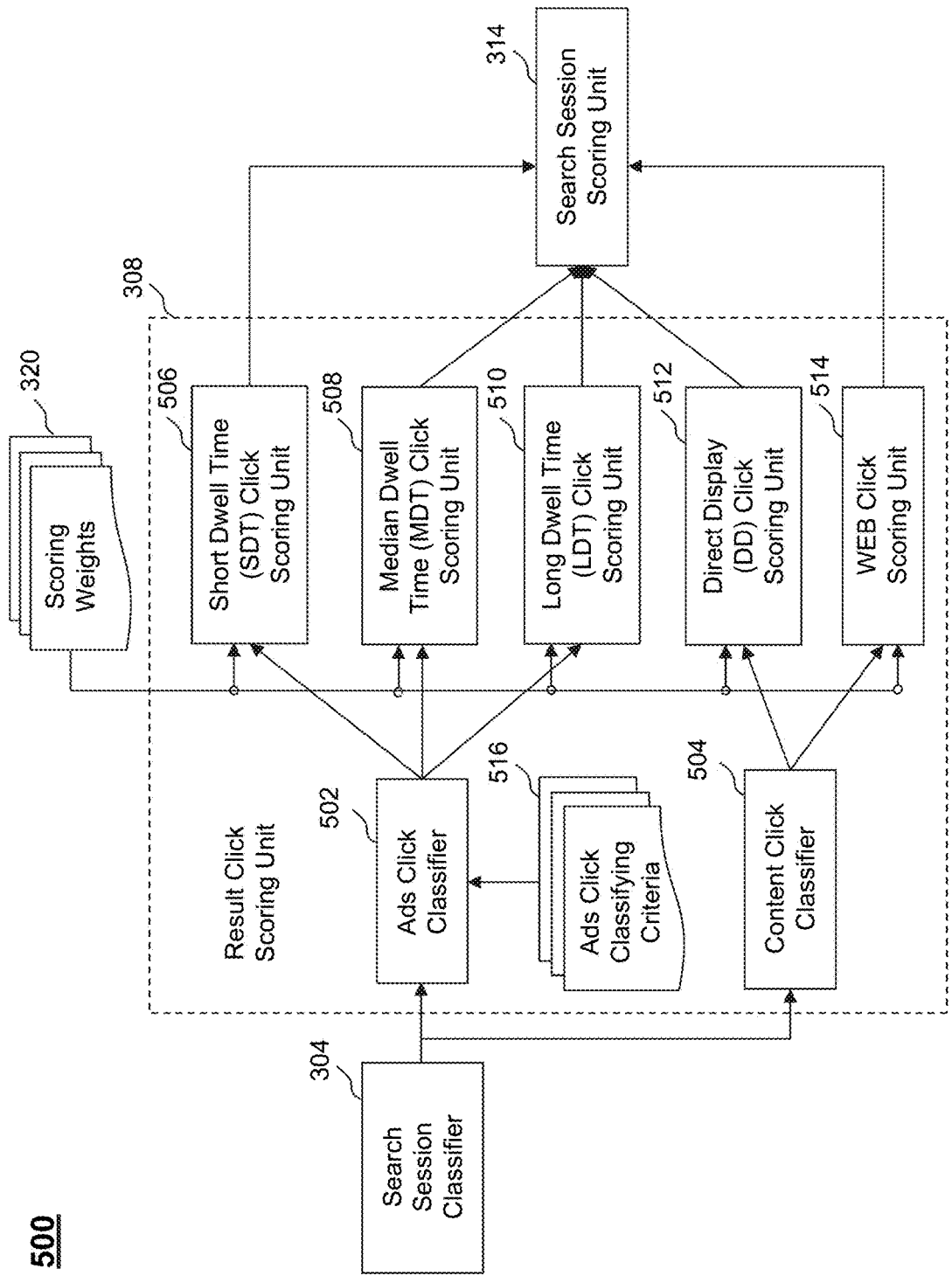
FIG. 5 illustrates an exemplary diagram of a result click scoring unit, according to an embodiment of the present teaching.

FIG. 5 illustrates an exemplary diagram of a result click scoring unit 308, according to an embodiment of the present teaching. As shown in FIG. 5, the result click scoring unit 308 in this example includes an ads click classifier 502, a content click classifier 504, one or more stored ads click classifying criteria 516, a short dwell time click scoring unit 506, a median dwell time click scoring unit 508, a long dwell time click scoring unit 510, a direct display click scoring unit 512, and a web click scoring unit 514.

The ads click classifier 502 in this example may receive a search session classified as a result click session from the search behavior classifier 304, and further identify the search session as an ads click session if the user clicks some advertisement during the session. The ads click classifier 502 may obtain one or more of the stored ads click classifying criteria 516 and use them to classify the ads click session into a corresponding click group based on dwell time of the user after the click. For example, the ads click classifier 502 may classify an ad click as a short dwell time click when the user dwells for less than a minute after clicking on the ad; the ads click classifier 502 may classify an ad click as a median dwell time click when the user dwells for more than a minute but less than five minutes after clicking on the ad; and the ads click classifier 502 may classify an ad click as a long dwell time click when the user dwells for more than five minutes after clicking on the ad. In another example, the ads click classifier 502 may classify an ad click as a short dwell time click when the user dwells for less than 10 seconds after clicking on the ad; the ads click classifier 502 may classify an ad click as a median dwell time click when the user dwells for more than 10 seconds but less than 100 seconds after clicking on the ad; and the ads click classifier 502 may classify an ad click as a long dwell time click when the user dwells for more than 100 seconds after clicking on the ad. The ads click classifier 502 may send the ad click information to different units according to its corresponding classified ad click group.

The short dwell time click scoring unit 506 in this example may receive ad click information from the ads click classifier 502 for any short dwell time click. The short dwell time click scoring unit 506 may compute a behavior score with respect to each short dwell time click. For example, if a user performs a short dwell time click with respect to a query-provider pair, the short dwell time click scoring unit 506 may increase a count number of short dwell time clicks with respect to the query-provider pair by one. The behavior score computed by the short dwell time click scoring unit 506 may be based on the count number and a predetermined scoring weight from the stored scoring weights 320. The short dwell time click scoring unit 506 may send the computed behavior score to the search session scoring unit 314 for computing a search session score.

The median dwell time click scoring unit 508 in this example may receive ad click information from the ads click classifier 502 for any median dwell time click. The median dwell time click scoring unit 508 may compute a behavior score with respect to each median dwell time click. For example, if a user performs a median dwell time click with respect to a query-provider pair, the median dwell time click scoring unit 508 may increase a count number of median dwell time clicks with respect to the query-provider pair by one. The behavior score computed by the median dwell time click scoring unit 508 may be based on the count number and a predetermined scoring weight from the stored scoring weights 320. The median dwell time click scoring unit 508 may send the computed behavior score to the search session scoring unit 314 for computing a search session score.

The long dwell time click scoring unit 510 in this example may receive ad click information from the ads click classifier 502 for any long dwell time click. The long dwell time click scoring unit 510 may compute a behavior score with respect to each long dwell time click. For example, if a user performs a long dwell time click with respect to a query-provider pair, the long dwell time click scoring unit 510 may increase a count number of long dwell time clicks with respect to the query-provider pair by one. The behavior score computed by the long dwell time click scoring unit 510 may be based on the count number and a predetermined scoring weight from the stored scoring weights 320. The long dwell time click scoring unit 510 may send the computed behavior score to the search session scoring unit 314 for computing a search session score.

The content click classifier 504 in this example may receive a search session classified as a result click session from the search behavior classifier 304, and further identify the search session as a content click session if the user clicks some content, e.g. search results, during the session. The content click classifier 504 may classify the content click session into a corresponding click group based on the type of content the user clicks on. For example, the content click classifier 504 may classify a content click as a direct display click when the user clicks on a direct display of the content without any hyperlink; and the content click classifier 504 may classify a content click as a web click when the user clicks on a web link in the search result page. The content click classifier 504 may send the content click information to different units according to its corresponding classified content click group.

The direct display click scoring unit 512 in this example may receive content click information from the content click classifier 504 for any direct display click. The direct display click scoring unit 512 may compute a behavior score with respect to each direct display click. For example, if a user performs a direct display click with respect to a query-provider pair, the direct display click scoring unit 512 may increase a count number of direct display clicks with respect to the query-provider pair by one. The behavior score computed by the direct display click scoring unit 512 may be based on the count number and a predetermined scoring weight from the stored scoring weights 320. The direct display click scoring unit 512 may send the computed behavior score to the search session scoring unit 314 for computing a search session score.

The web click scoring unit 514 in this example may receive content click information from the content click classifier 504 for any web click. The web click scoring unit 514 may compute a behavior score with respect to each web click. For example, if a user performs a web click with respect to a query-provider pair, the web click scoring unit 514 may increase a count number of web clicks with respect to the query-provider pair by one. The behavior score computed by the web click scoring unit 514 may be based on the count number and a predetermined scoring weight from the stored scoring weights 320. The web click scoring unit 514 may send the computed behavior score to the search session scoring unit 314 for computing a search session score.

As discussed above, the search session scoring unit 314 may estimate a search session score using a plurality of scoring weights and the computed behavior scores with respect to the ads clicks and the content clicks associated with the search session.

In one embodiment, a search session score may be associated with one or more query-provider pairs. The system may run simulations of many queries on various providers to compute the search session scores. In real time, after a query is submitted, the system predicts a performance score for each provider when the query is directed to the provider for searching. The prediction of performance score may be based on an aggregation of all search session scores associated with the query and the provider, i.e. associated with the query-provider pair. In one embodiment, if the query submitted has not been simulated such that no search session scores exist for the query, then the system can identify one or more similar queries of the query and predicts the performance score for each provider based on an aggregation of all search session scores associated with all of the similar queries and the provider. In one example, the aggregation discussed herein about predicting performance score includes normalization over number of queries performed in real time or in simulation on different providers. This may be fair to compare a new provider and a long-existing provider by normalizing performance score over total number of queries or search sessions performed on each of the two providers, especially when count numbers of clicks are considered for computing performance scores.

Figure 6:
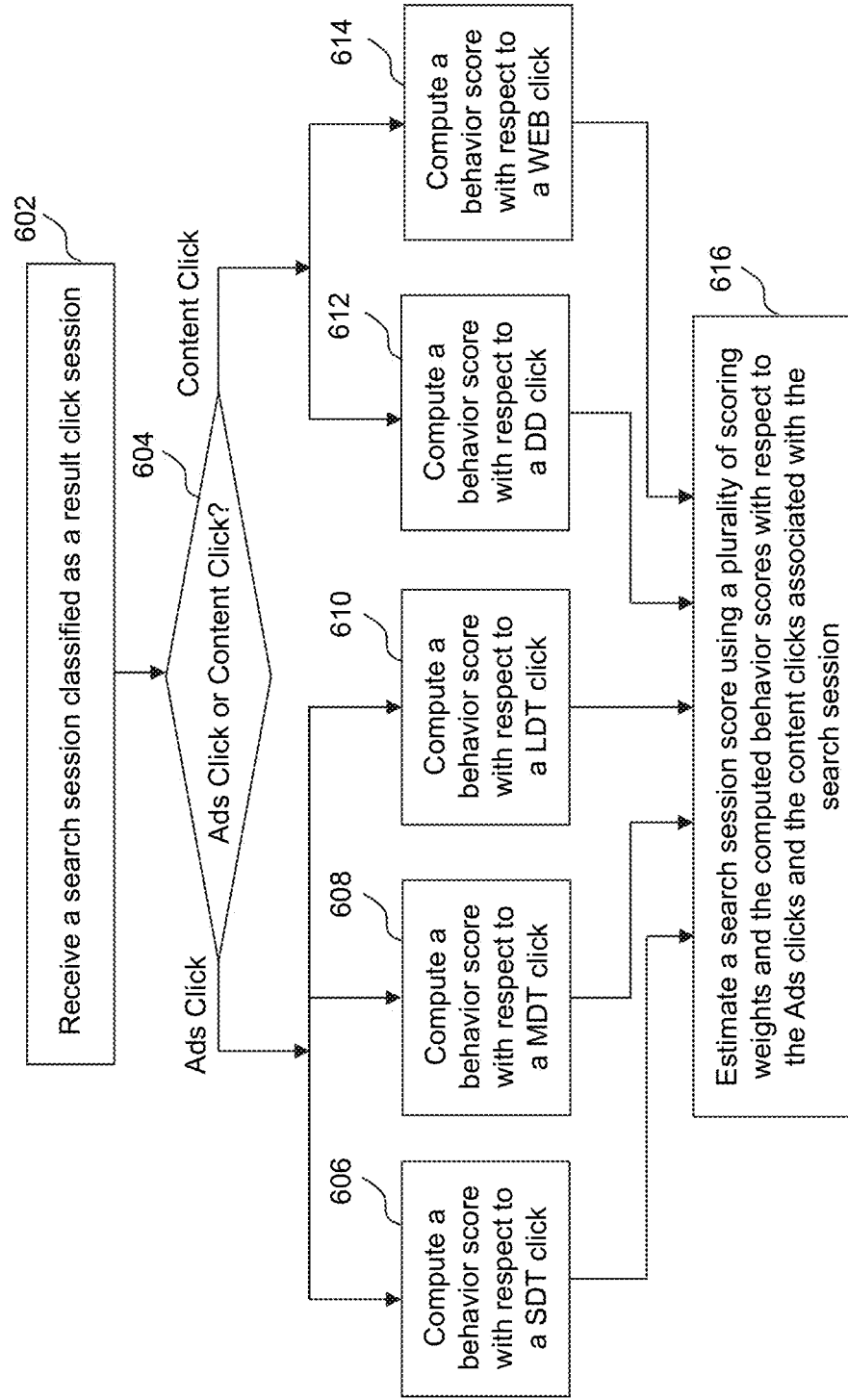
FIG. 6 is a flowchart of an exemplary process performed by a result click scoring unit, according to an embodiment of the present teaching.

FIG. 6 is a flowchart of an exemplary process performed by a result click scoring unit, e.g. the result click scoring unit 308 in FIG. 5, according to an embodiment of the present teaching. A search session classified as a result click session is received at 602. At 604, it is determined that when the click in the session is an ads click or a content click. If it is an ads click, the process goes to 606, 608, or 610, depending on whether the click is a short dwell time click, a median dwell time click, or a long dwell time click, respectively. At 606, a behavior score with respect to a short dwell time click is computed and the process moves to 616. At 608, a behavior score with respect to a median dwell time click is computed and the process moves to 616. At 610, a behavior score with respect to a long dwell time click is computed and the process moves to 616.

If it is determined at 604 that the click is a content click, the process goes to 612 or 614, depending on whether the click is a direct display click or a web click, respectively. At 612, a behavior score with respect to a direct display click is computed and the process moves to 616. At 614, a behavior score with respect to a web click is computed and the process moves to 616. At 616, a search session score is estimated using a plurality of scoring weights and the computed behavior scores with respect to the Ads clicks and the content clicks associated with the search session.

Figure 7:
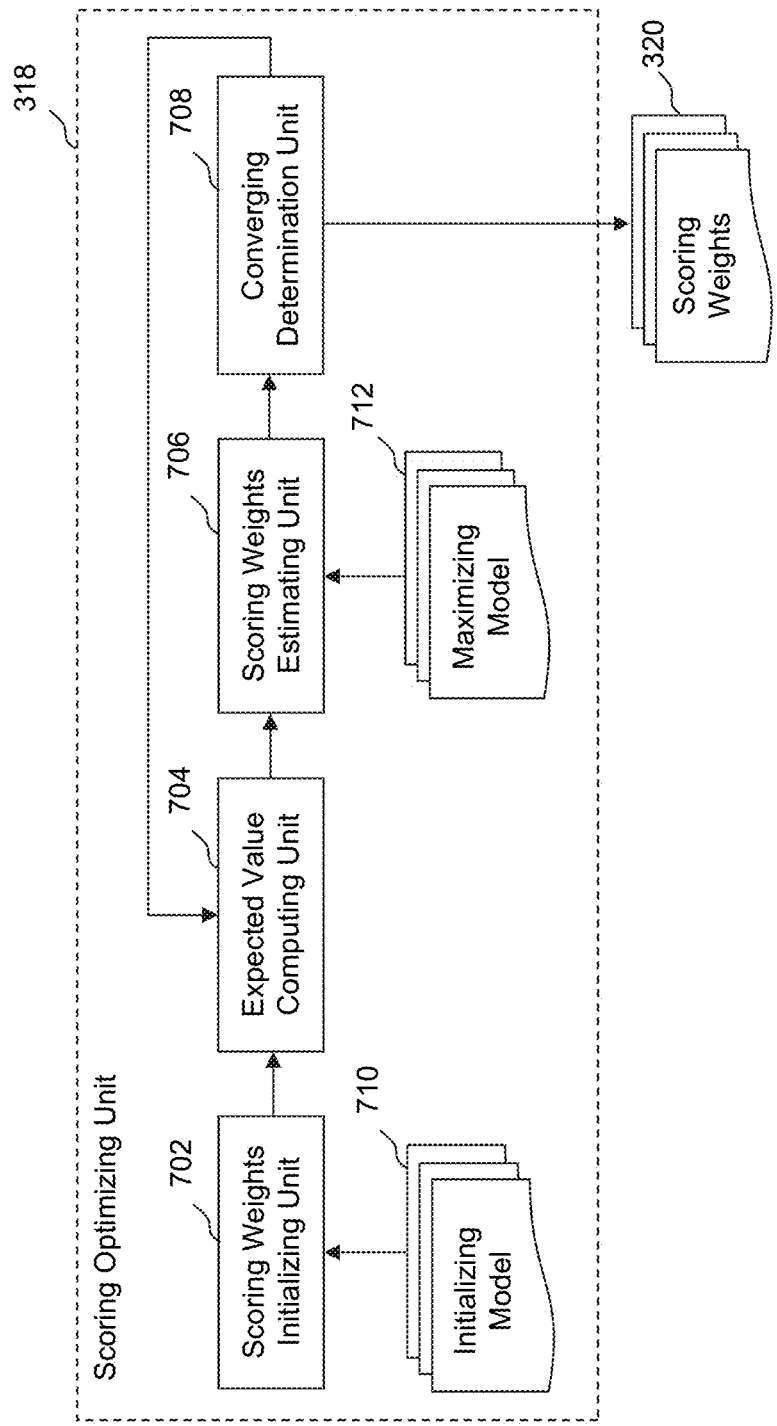
FIG. 7 illustrates an exemplary diagram of a scoring optimizing unit, according to an embodiment of the present teaching.

FIG. 7 illustrates an exemplary diagram of a scoring optimizing unit 318, according to an embodiment of the present teaching. As shown in FIG. 7, the scoring optimizing unit 318 in this example includes a scoring weights initializing unit 702, an expected value computing unit 704, a scoring weights estimating unit 706, a converging determination unit 708, one or more stored initializing models 710, and one or more stored maximizing models 712.

The scoring optimizing unit 318 may optimize the scoring weights 320 using an expectation-maximization algorithm. The scoring weights initializing unit 702 in this example may initialize a plurality of scoring weights using an initializing model. For example, the scoring weights initializing unit 702 may initialize the plurality of scoring weights using random numbers or based on previously optimized scoring weights. The scoring weights initializing unit 702 may send the initialized plurality of scoring weights to the expected value computing unit 704 for computing expected values.

The expected value computing unit 704 in this example may compute one or more expected values associated with the initializing model. The expected value computing unit 704 may send the one or more expected values to the scoring weights estimating unit 706 for estimating a plurality of new scoring weights. At the beginning of the algorithm, the expected value computing unit 704 may compute the expected values based on the initialized plurality of scoring weights received from the scoring weights initializing unit 702. Then, during the optimization, the expected value computing unit 704 may iteratively compute the expected values based on the estimated plurality of new scoring weights generated by the scoring weights estimating unit 706.

The scoring weights estimating unit 706 in this example may receive the one or more expected values from the expected value computing unit 704. The scoring weights estimating unit 706 may select one of the maximizing models 712 and use the selected maximizing model to estimate a plurality of new values with respect to the plurality of scoring weights. For example, the scoring weights estimating unit 706 may estimate the new scoring weights by calculating a maximum likelihood or a maximum a posteriori probability of parameters in a tree shaped scoring model to learn various scoring weights for optimized measurement of user search behavior. The scoring weights estimating unit 706 may send the estimated new values to the converging determination unit 708 for determining whether there is a convergence.

The converging determination unit 708 in this example may determine whether the algorithm converges. For example, the converging determination unit 708 may determine that the algorithm converges when the differences between the new values of scoring weights and the previous values of scoring weights in a preceding round are less than a predetermined threshold. When the converging determination unit 708 determines that there is a convergence, the converging determination unit 708 can store the plurality of new values as the plurality of scoring weights 320. When the converging determination unit 708 determines that there is not a convergence, the converging determination unit 708 can instruct the expected value computing unit 704 to re-compute the one or more expected values based on the new values.

Figure 8:
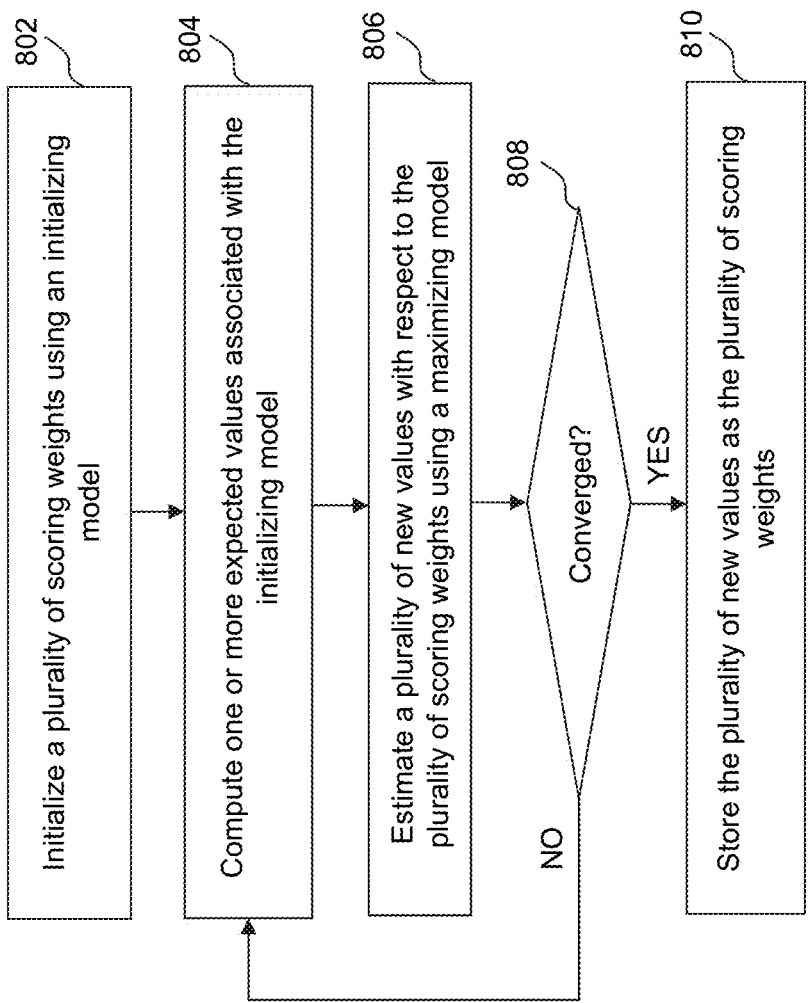
FIG. 8 is a flowchart of an exemplary process performed by a scoring optimizing unit, according to an embodiment of the present teaching.

FIG. 8 is a flowchart of an exemplary process performed by a scoring optimizing unit, e.g. the scoring optimizing unit 318 in FIG. 7, according to an embodiment of the present teaching. A plurality of scoring weights is initialized at 802 using an initializing model. One or more expected values are computed at 804. A plurality of new values is estimated at 806 with respect to the plurality of scoring weights using a maximizing model.

At 808, it is determined that whether the process converges. If so, the process moves to 810, where the plurality of new values are stored as the plurality of scoring weights. Otherwise, the process moves back to 804 to re-compute one or more expected values based on the new values.

It can be understood that the order of the steps shown in FIG. 2A, FIG. 2B, FIG. 4, FIG. 6, and FIG. 8 may be changed according to different embodiments of the present teaching.

Figure 9:
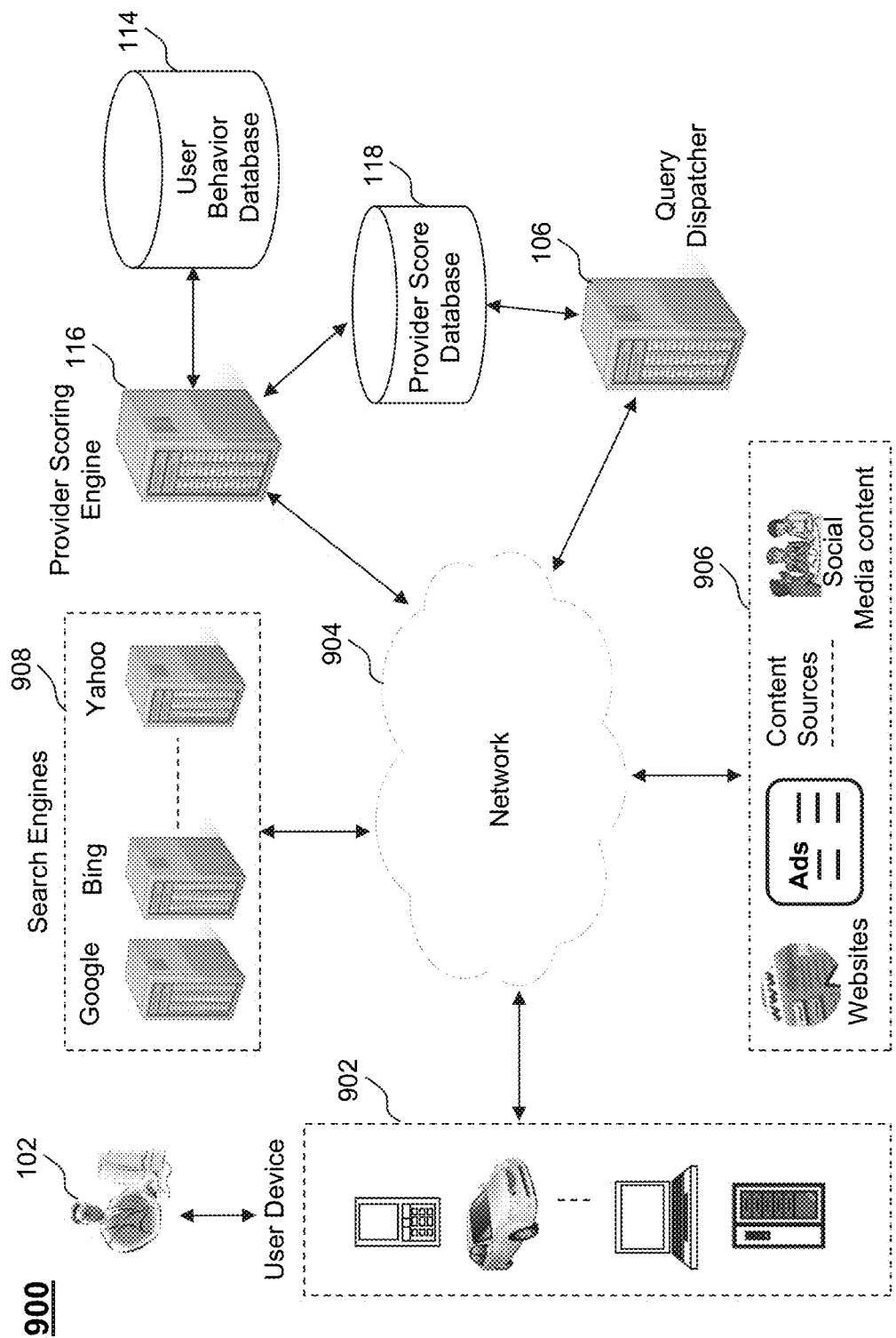
FIG. 9 is a high level depiction of an exemplary networked environment for search provider selection with respect to each query, according to an embodiment of the present teaching.

FIG. 9 is a high level depiction of an exemplary networked environment 900 for search provider selection with respect to each query, according to an embodiment of the present teaching. In FIG. 9, the exemplary networked environment 100 includes a user 102, one or more user devices 902, a network 904, a provider scoring engine 116, a query dispatcher 106, a provider score database 118, a user behavior database 114, one or more search engines 908, and content providers 906. In this exemplary networked environment 900, the user 102 may send a search query via one or more of the user devices 902, through the network 904 or via an internal or proprietary network connection (not shown), to the query dispatcher 106.

The network 904 may be a single network or a combination of different networks. For example, the network 904 may be a local area network (LAN), a wide area network (WAN), a public network, a private network, a proprietary network, a Public Telephone Switched Network (PSTN), the Internet, a wireless network, a virtual network, or any combination thereof. The network 904 may also include various network access points, e.g., wired or wireless access points such as base stations or Internet exchange points through which a data source may connect to the network in order to transmit information via the network.

User devices 902 connected to the network 904 may be of different types such as desktop computers, laptop computers, a built-in device in a motor vehicle, or a mobile device. In one embodiment, the user devices 902 may be connected to the network 904 and able to interact with the query dispatcher 106 and the search engines 908 through wired or wireless technologies and related operating systems implemented within user-wearable devices (e.g., glasses, wrist watch, etc.).

In this example, the query dispatcher 106 may select one of the search engines 908 based on the search query submitted by the user 102. In particular, the selection is based on performance scores of the search providers obtained from the provider score database 118 with respect to the search query. Then, the query dispatcher 106 may dispatch the query to the selected search provider or search engine for performing online search to generate one or more search results. The selected search engine may provide the search results as well as some advertisements related to the query, to be presented to the user 102.

The provider scoring engine 116 in this example may generate or update the providers' performance scores in the provider score database 118, based on user behaviors during each search session. The provider scoring engine 116 may obtain the user behaviors from the user behavior database 114, which includes monitored user behaviors during searching, e.g. clicking, quick retry, reformulation, abandonment, etc. The provider scoring engine 116 may analyze these behaviors, e.g. by classifying clicking behaviors based on the user's dwell time after the clicking and based on the type of content the user clicked on. The provider scoring engine 116 may use an algorithm or a machine learning method to generate or update providers' performance scores based on the user behaviors, taking into consideration of user behaviors with respect to both content items and advertisements presented to the user in response to the query.

Each of the search engines 908, once being selected, can perform search based on the query and provide search results as well as advertisements or other commercial links to the user. In one embodiment, the provider scoring engine 116 may run simulations with different queries submitted to the search engines 908, and compute their performance scores with respect to different queries. For example, for each distinct search query, the provider scoring engine 116 may run a simulation by submitting the query to all of the search engines 908. For each search engine, the provider scoring engine 116 may compute an aggregated success score over the search query, based on predicted user experience with search results and user's ad related behaviors. The provider scoring engine 116 may then compare the aggregated success scores of the search engines 908 and associate the query with a corresponding search engine that has the highest score for the query. The provider scoring engine 116 may store the information about associations between each simulated query and a corresponding provider into the provider score database 118, such that the query dispatcher 106 may select a provider for a query based on the query's association in the provider score database 118.

The content sources 906 in the exemplary networked environment 900 include multiple content sources, e.g. websites, advertisements, social media content, etc. A content source 906 may correspond to a website hosted by an entity, whether an individual, a business, or an organization such as USPTO.gov, a content provider such as cnn.com and Yahoo.com, a social network website such as Facebook.com, or a content feed source such as tweeter or blogs. Each of the search engines 908 may access information from any of the content sources. For example, a search engine may fetch content, e.g., websites, through its web crawler to build a search index.

Figure 10:
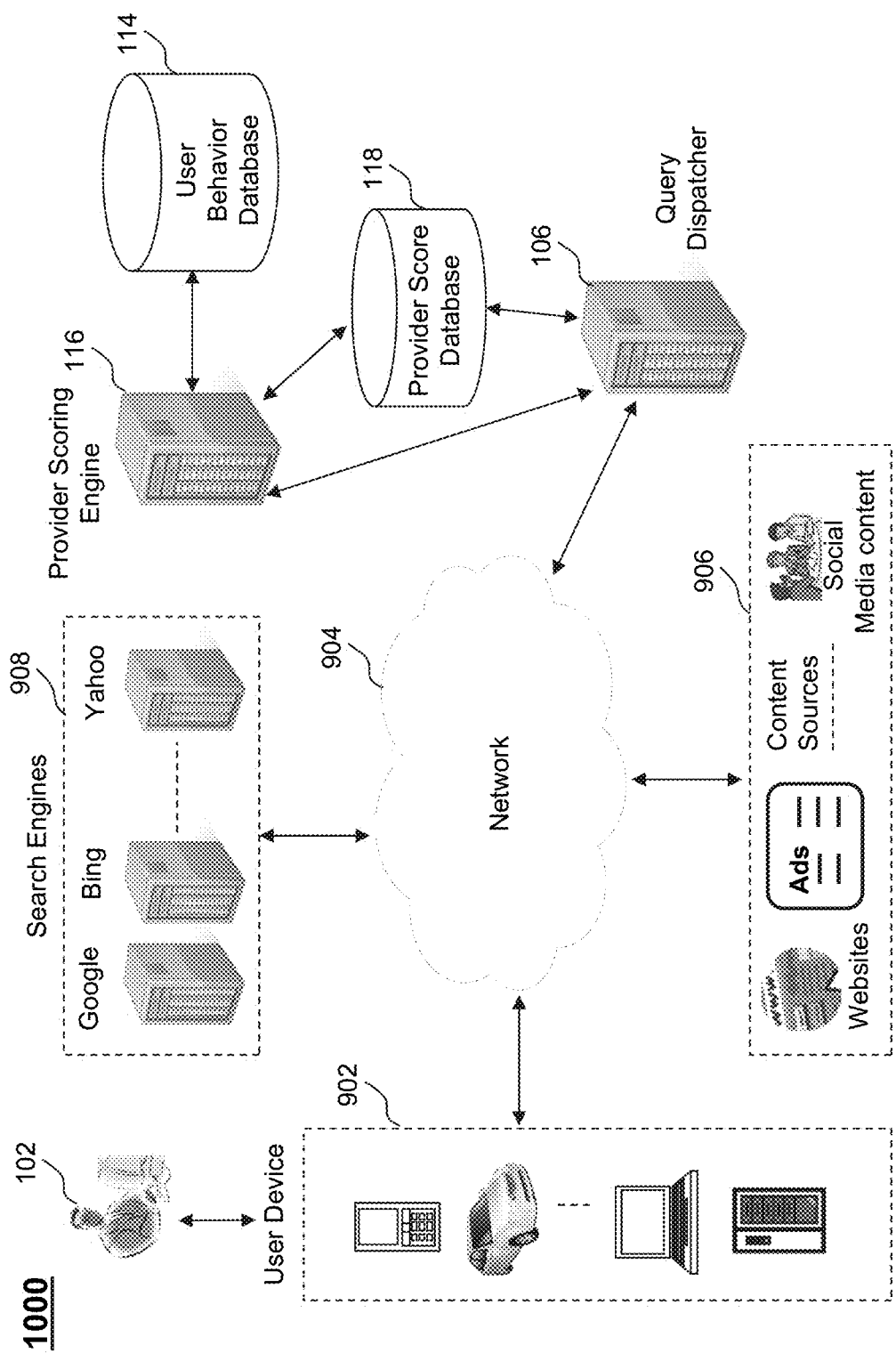
FIG. 10 is a high level depiction of another exemplary networked environment for search provider selection with respect to each query, according to an embodiment of the present teaching.

FIG. 10 is a high level depiction of another exemplary networked environment 1000 for search provider selection with respect to each query, according to an embodiment of the present teaching. The exemplary networked environment 1000 in this embodiment is similar to the exemplary networked environment 900 in FIG. 9, except that the provider scoring engine 116 may serve as a backend system of the query dispatcher 106.

Figure 11:
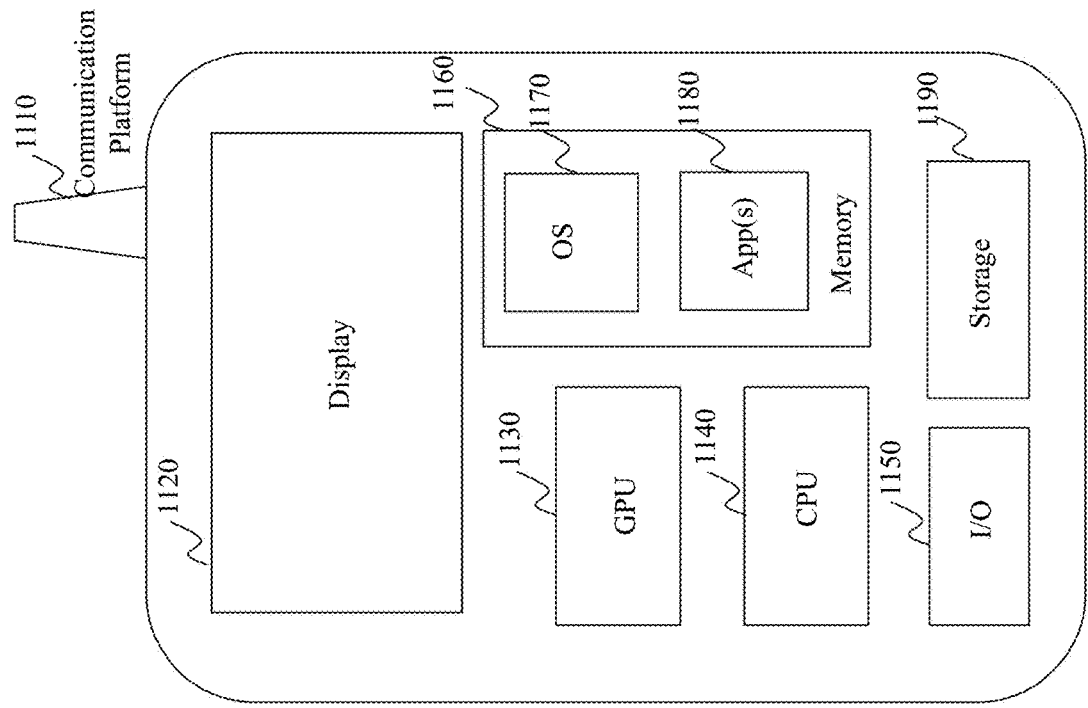
FIG. 11 depicts the architecture of a mobile device which can be used to implement a specialized system incorporating the present teaching.

FIG. 11 depicts the architecture of a mobile device which can be used to realize a specialized system implementing the present teaching. In this example, the provider scoring engine 116 and/or the query dispatcher 106 may be a mobile device 1100, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1100 in this example includes one or more central processing units (CPUs) 1140, one or more graphic processing units (GPUs) 1130, a display 1120, a memory 1160, a communication platform 1110, such as a wireless communication module, storage 1190, and one or more input/output (I/O) devices 1150. Any other suitable component, including but not limited to a system bus or a controller (not shown), may also be included in the mobile device 1100. As shown in FIG. 11, a mobile operating system 1170, e.g., iOS, Android, Windows Phone, etc., and one or more applications 1180 may be loaded into the memory 1160 from the storage 1190 in order to be executed by the CPU 1140. The applications 1180 may include a browser or any other suitable mobile apps for resource management on the mobile device 1100. User interactions with the device 1100 may be achieved via the I/O devices 1150.

To implement various modules, units, and their functionalities described in the present disclosure, computer hardware platforms may be used as the hardware platform(s) for one or more of the elements described herein (e.g., the provider scoring engine 116, the query dispatcher 106, and/or other components of the systems 900 and 1000 described with respect to FIGS. 1-10). The hardware elements, operating systems and programming languages of such computers are conventional in nature, and it is presumed that those skilled in the art are adequately familiar therewith to adapt those technologies to managing computing resource utilization based on reinforcement learning as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 12:
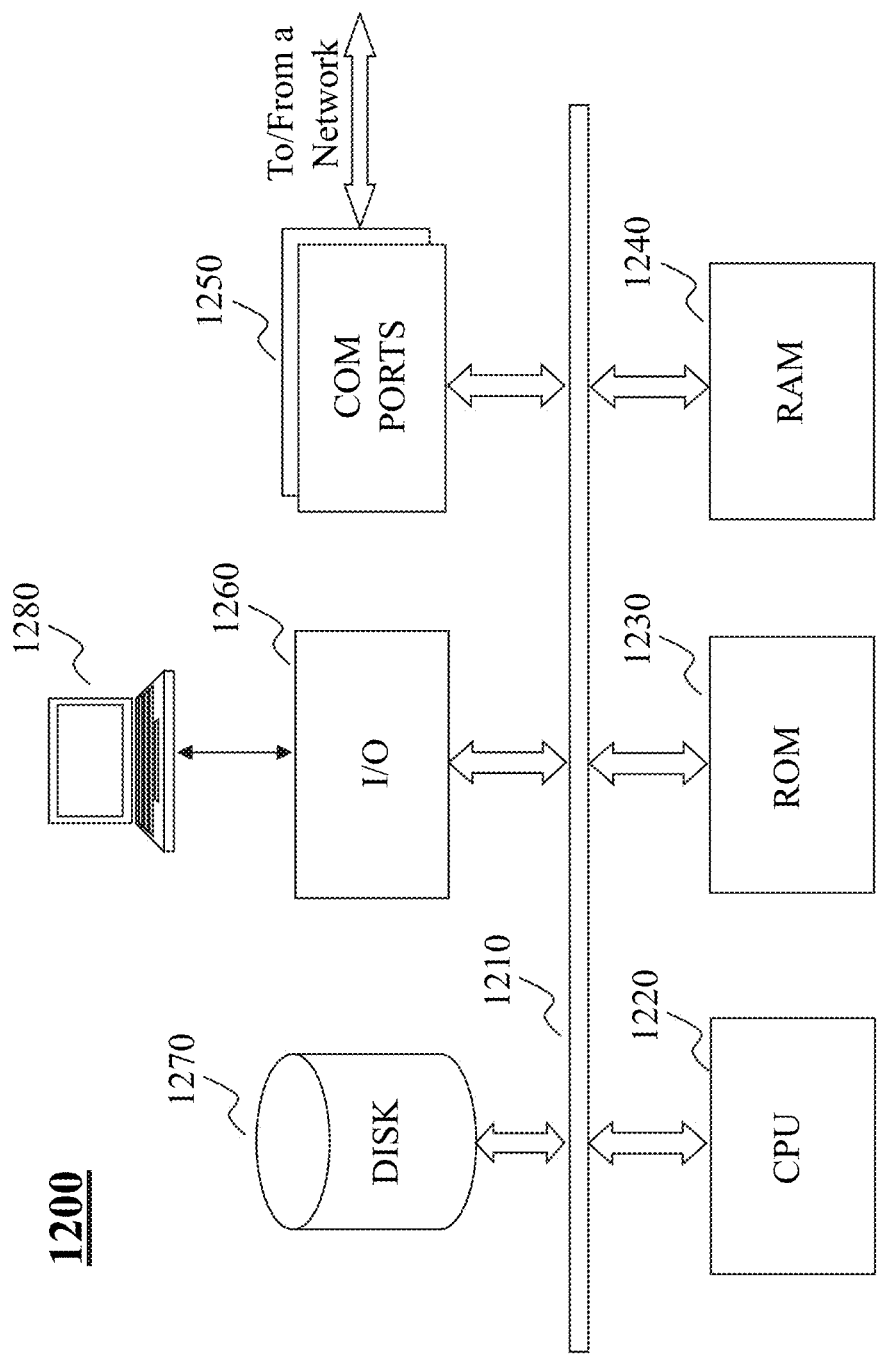
FIG. 12 depicts the architecture of a computer which can be used to implement a specialized system incorporating the present teaching.

FIG. 12 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1200 may be used to implement any component of the techniques about search provider selection with respect to each query, as described herein. For example, the provider scoring engine 116, the query dispatcher 106, etc., may be implemented on a computer such as computer 1200, via its hardware, software program, firmware, or a combination thereof. Although only one such computer is shown, for convenience, the computer functions relating to search provider selection with respect to each query as described herein may be implemented in a distributed fashion on a number of similar platforms, to distribute the processing load.

The computer 1200, for example, includes COM ports 1250 connected to and from a network connected thereto to facilitate data communications. The computer 1200 also includes a central processing unit (CPU) 1220, in the form of one or more processors, for executing program instructions. The exemplary computer platform includes an internal communication bus 1210, program storage and data storage of different forms, e.g., disk 1270, read only memory (ROM) 1230, or random access memory (RAM) 1240, for various data files to be processed and/or communicated by the computer, as well as possibly program instructions to be executed by the CPU. The computer 1200 also includes an I/O component 1260, supporting input/output flows between the computer and other components therein such as user interface elements 1280. The computer 1200 may also receive programming and data via network communications.

Hence, aspects of the methods of search provider selection with respect to each query, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from one device into the hardware platform(s) of a computing environment or other system implementing a computing environment or similar functionalities in connection with techniques of search provider selection with respect to each query. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the search provider selection with respect to each query as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on a computing device having at least one processor, storage, and a communication platform connected to a network for directing a search query, the method comprising:

receiving a search query from a user;

obtaining, dynamically in response to the received search query, a plurality of performance scores associated with a respective plurality of providers, wherein each of the plurality of performance scores indicates a predicted level of user satisfaction with a corresponding one of the plurality of providers estimated based on information related to prior interactions with the corresponding provider associated with one or more search queries similar to the received search query, wherein:

the information related to the prior interactions includes a dwell time on content provided by the corresponding provider or a click event associated with the dwell time, which are respectively characterized by user engagement determined based on a classification of the dwell time or a corresponding click rate associated with the classified dwell time, and each of the plurality of performance scores is determined based on a plurality of scoring weights determined based on an expectation-maximization model and user prior experience with a plurality of content items and a plurality of advertisements provided by the corresponding provider in response to the one or more search queries similar to the received search query;

selecting, in real time in response to the search query being received, one of the plurality of providers based on the search query and the plurality of performance scores with respect to the search query;

transmitting the search query to the selected one of the plurality of providers;

receiving one or more search results in response to the search query from the selected one of the plurality of providers; and providing the one or more search results to the user.

2. The method of claim 1, wherein the level of user satisfaction is determined based on the user prior experience, and wherein the user prior experience with the plurality of content items and the plurality of advertisements comprise one or more click events with the plurality of content items and the plurality of advertisements.

3. The method of claim 2, wherein:
the plurality of content items comprise one or more direct display content items and one or more web content items, each of which is accessible via clicking a link, and
the user prior experience with the plurality of content items is evaluated based on a first number of clicks of the user on the one or more direct display content items and a second number of clicks of the user on the one or more web content items.

4. The method of claim 2, wherein:
the user prior experience with the plurality of advertisements is classified into one of three behavioral sessions based on lengths of a plurality of dwell times that the user spent on the plurality of advertisements, respectively, the three behavioral sessions including a short dwell time session, a median dwell time session, and a long dwell time session, and
the user prior experience with the plurality of advertisements is evaluated based on a first number of clicks of the user during the short dwell time session, a second number of clicks of the user during the median dwell time session, and a third number of clicks of the user during the long dwell time session, wherein each of the plurality of performance scores is computed based on at least one of the first number of clicks, the second number of clicks, or the third number of clicks.

5. The method of claim 1, further comprising:
collecting user interaction information with the one or more search results;
re-evaluating the performance score associated with the selected one of the plurality of providers based on the user interaction information; and
updating a provider score database based on the re-evaluated performance score.

6. The method of claim 5, wherein the user interaction information comprises:
a first number of clicks on one or more direct display content items in the one or more search results;
a second number of clicks on one or more web content items in the one or more search results;
a third number of clicks during a short dwell time session that the user spent on a plurality of advertisements in the one or more search results;
a fourth number of clicks during a median dwell time session that the user spent on the plurality of advertisements in the one or more search results; and
a fifth number of clicks during a long dwell time session that the user spent on the plurality of advertisements in the one or more search results.

7. The method of claim 6, further comprising:
assigning a respective scoring weight to each of the first number of clicks, the second number of clicks, the third number of clicks, the fourth number of clicks, and the fifth number of clicks; and
computing the performance score associated with the selected one of the plurality of providers based on the respective scoring weights and the user interaction information.

8. A method implemented on a computing device having at least one processor, storage, and a communication platform connected to a network for evaluating performance of a search provider, the method comprising:

retrieving search behavior information in response to receipt of a search query from a user;
identifying a plurality of search behaviors associated with a search result page rendered by a search provider with respect to the search query, the search result page including at least one content item and at least one advertisement;
estimating a performance score of the search provider with respect to the search query based on information related to one or more first search behaviors directed to the at least one content item and one or more second search behaviors directed to the at least one advertisement, wherein the performance score is determined based on a plurality of scoring weights determined based on an expectation-maximization model and user prior experience with a plurality of content items and a plurality of advertisements provided by the search provider in response to one or more search queries similar to the search query, and wherein the information related to the one or more first search behaviors and the one or more second search behaviors includes:
user engagement determined based on a classification of a dwell time spent by the user on the at least one content item, the at least one advertisement, or the at least one content item and the at least one advertisement, or
a corresponding number of clicks of the user during the classified dwell time;
storing the performance score of the search provider with respect to the search query in a provider score database, wherein the performance score of the search provider indicates a predicted level of user satisfaction with the search provider;
receiving a new search query from a different user;
obtaining, in real-time in response to receiving the new search query and based on the new search query being the same or similar to the search query, the performance score of the search provider and one or more additional performance scores respectively associated with one or more additional search providers;
selecting, in real-time in response to receiving the new search query, the search provider from a plurality of search providers including the search provider and the one or more additional search providers in real time based on (i) the performance score of the search provider with respect to the search query, (ii) the new search query being identified as similar to the search query;
transmitting the new search query to the search provider;
receiving one or more search results from the search provider, the one or more search results comprising the at least one content item and the at least one advertisement; and
providing the one or more search results to the different user.

9. A system having at least one processor, storage, and a communication platform connected to a network for directing a search query, the system comprising:
a query dispatcher configured for:
receiving, from a user interface of a user device, a search query,
obtaining, dynamically in response to the received search query, a plurality of performance scores associated with a respective plurality of providers, wherein each of the plurality of performance scores indicates a predicted level of user satisfaction with a corresponding one of the plurality of providers estimated based on information related to prior interactions with the corresponding provider associated with one or more search queries similar to the received search query, wherein:

the information related to the prior interactions includes a dwell time on content provided by the corresponding provider or a click event associated with the dwell time, which are respectively characterized by user engagement determined based on a classification of the dwell time or a corresponding click rate associated with the classified dwell time, and each of the plurality of performance scores is determined based a plurality of scoring weights determined based on an expectation-maximization model and user prior experience with a plurality of content items and a plurality of advertisements provided by the corresponding provider in response to the one or more search queries similar to the received search query, selecting, in real time in response to the search query being received, one of the plurality of providers based on the search query and the plurality of performance scores with respect to the search query, and transmitting the search query to the selected one of the plurality of providers, wherein one or more search results are provided to the user device from the selected one of the plurality of providers in response to the search query being transmitted to the selected one of the plurality of providers.

10. The system of claim 9:

wherein the level of user satisfaction is determined based on the user prior experience, and wherein the user prior experience with the plurality of content items and the plurality of advertisements comprise one or more click events with the plurality of content items and the plurality of advertisements.

11. The system of claim 10, wherein:

the plurality of content items comprise one or more direct display content items and one or more web content items, each of which is accessible via clicking a link, and the user prior experience with the plurality of content items is evaluated based on a first number of clicks of the user on the one or more direct display content items and a second number of clicks of the user on the one or more web content items.

12. The system of claim 10, wherein:

the user prior experience with the plurality of advertisements is classified into three behavioral sessions based on lengths of a plurality of dwell times that the user spent on the plurality of advertisements, respectively, the three behavioral sessions including a short dwell time session, a median dwell time session, and a long dwell time session, and the user prior experience with the plurality of advertisements is evaluated based on a first number of clicks of the user during the short dwell time session, a second number of clicks of the user during the median dwell time session, and a third number of clicks of the user during the long dwell time session, wherein each of the plurality of performance scores is computed based on at least one of the first number of clicks, the second number of clicks, or the third number of clicks.

13. The system of claim 9, further comprising:

a user activity monitoring module configured for collecting user interaction information with the one or more search results, wherein the query dispatcher is further configured for:

re-evaluating the performance score associated with the selected one of the plurality of providers based on the user interaction information, and updating a provider database based on the re-evaluated performance score.

14. The system of claim 13, wherein the user interaction information comprises:

a first number of clicks on one or more direct display content items in the one or more search results;

a second number of clicks on one or more web content items in the one or more search results;

a third number of clicks during a short dwell time session that the user spent on a plurality of advertisements in the one or more search results;

a fourth number of clicks during a median dwell time session that the user spent on the plurality of advertisements in the one or more search results; and a fifth number of clicks during a long dwell time session that the user spent on the plurality of advertisements in the one or more search results.

15. The system of claim 14, further comprising:

a scoring optimizing unit configured for:

assigning a respective scoring weight to each of the first number of clicks, the second number of clicks, the third number of clicks, the fourth number of clicks, and the fifth number of clicks; and computing the performance score associated with the selected one of the plurality of providers based on the respective scoring weights and the user interaction information.

16. A machine-readable tangible and non-transitory medium having information for directing a search query, wherein the information, when read by the machine, effectuate operations comprising:

receiving a search query from a user;

obtaining, dynamically in response to the received search query, a plurality of performance scores associated with a respective plurality of providers, wherein each of the plurality of performance scores indicates a predicted level of user satisfaction with a corresponding one of the plurality of providers estimated based on information related to prior interactions with the corresponding provider associated with one or more search queries similar to the received search query, wherein:

the information related to the prior interactions includes a dwell time on content provided by the corresponding provider or a click event associated with the dwell time, which are respectively characterized by user engagement determined based on the dwell time or a corresponding click rate associated with the classified dwell time, and each of the plurality of performance scores is determined based on a plurality of scoring weights determined based on an expectation-maximization model and user prior experience with a plurality of content items and a plurality of advertisements provided by the corresponding provider in response to the one or more search queries similar to the received search query;

selecting, in real time in response to the search query being received, one of the plurality of providers based on the search query and the plurality of performance scores with respect to the search query;

transmitting the search query to the selected one of the plurality of providers;
receiving one or more search results in response to the search query from the selected one of the plurality of providers; and
providing the one or more search results to the user.

17. The medium of claim 16,
wherein the level of user satisfaction is determined based on the user prior experience, and wherein the user prior experience with the plurality of content items and the plurality of advertisements comprise one or more click events with the plurality of content items and the plurality of advertisements.

18. The medium of claim 17, wherein:
the plurality of content items comprise one or more direct display content items and one or more web content items, each of which is accessible via clicking a link, and
the user prior experience with the plurality of content items is evaluated based on a first number of clicks of the user on the one or more direct display content items and a second number of clicks of the user on the one or more web content items.

19. The medium of claim 17, wherein:
the user prior experience with the plurality of advertisements is classified into three behavioral sessions based on lengths of a plurality of dwell times that the user spent on the plurality of advertisements, respectively, the three behavioral sessions including a short dwell time session, a median dwell time session, and a long dwell time session, and
the user prior experience with the plurality of advertisements is evaluated based on a first number of clicks of the user during the short dwell time session, a second number of clicks of the user during the median dwell time session, and a third number of clicks of the user during the long dwell time session, wherein each of the plurality of performance scores is computed based on at least one of the first number of clicks, the second number of clicks, or the third number of clicks.

20. The medium of claim 16, wherein the operations further comprise:
collecting user interaction information with the one or more search results;
re-evaluating the performance score associated with the selected one of the plurality of providers based on the user interaction information; and
updating a provider score database based on the re-evaluated performance score.

21. The medium of claim 20, wherein the user interaction information comprises:
a first number of clicks on one or more direct display content items in the one or more search results;
a second number of clicks on one or more web content items in the one or more search results;
a third number of clicks during a short dwell time session that the user spent on a plurality of advertisements in the one or more search results;
a fourth number of clicks during a median dwell time session that the user spent on the plurality of advertisements in the one or more search results; and
a fifth number of clicks during a long dwell time session that the user spent on the plurality of advertisements in the one or more search results.

22. The medium of claim 21, wherein the operations further comprise:
assigning a respective scoring weight to each of the first number of clicks, the second number of clicks, the third number of clicks, the fourth number of clicks, and the fifth number of clicks; and
computing the performance score associated with the selected one of the plurality of providers based on the respective scoring weights and the user interaction information.

\* \* \* \* \*